United States Patent
Avraham et al.

(10) Patent No.: US 12,451,187 B2
(45) Date of Patent: Oct. 21, 2025

(54) DATA STORAGE DEVICE AND METHOD FOR INFERRING A READ THRESHOLD USING A TIME TAG DETERMINATION

(71) Applicant: Sandisk Technologies, Inc., Milpitas, CA (US)

(72) Inventors: David Avraham, San Jose, CA (US); Ariel Navon, Revava (IL); Alexander Bazarsky, Holon (IL); Eran Sharon, Rishon Lezion (IL)

(73) Assignee: Sandisk Technologies, Inc., Milpitas, CA (US)

( * ) Notice: Subject to any disclaimer, the term of this patent is extended or adjusted under 35 U.S.C. 154(b) by 161 days.

(21) Appl. No.: 18/239,302

(22) Filed: Aug. 29, 2023

(65) Prior Publication Data

US 2025/0078930 A1    Mar. 6, 2025

(51) Int. Cl.
  *G11C 16/08*   (2006.01)
  *G11C 16/10*   (2006.01)

(52) U.S. Cl.
  CPC ............ *G11C 16/08* (2013.01); *G11C 16/105* (2013.01)

(58) Field of Classification Search
  CPC ..... G11C 16/3459; G11C 16/08; G11C 16/26; G11C 11/5628; G11C 11/5642; G11C 16/0483; G11C 16/10; G11C 16/32; G11C 16/105; G11C 2029/0409; G11C 2029/0411; G11C 2029/1202; G11C 7/04; G06F 13/1668; G06N 20/00
  See application file for complete search history.

(56) References Cited

U.S. PATENT DOCUMENTS

| | | | |
|---|---|---|---|
| 6,154,157 A | * | 11/2000 | Wong ................. G06J 1/00 341/110 |
| 7,876,671 B2 | | 1/2011 | Pimlott |
| 7,995,387 B2 | | 8/2011 | Sharon et al. |
| 8,374,026 B2 | | 2/2013 | Sharon et al. |
| 8,782,495 B2 | | 7/2014 | Alrod et al. |
| 9,070,479 B2 | | 6/2015 | Sharon et al. |
| 9,141,475 B2 | | 9/2015 | Alrod et al. |
| 9,431,120 B1 | | 8/2016 | Tuers |
| 9,697,905 B2 | | 7/2017 | Sharon et al. |
| 9,728,263 B2 | | 8/2017 | Sharon |
| 9,996,281 B2 | | 6/2018 | Sharon et al. |
| 10,379,739 B1 | | 8/2019 | Bazarsky et al. |
| 10,418,097 B2 | | 9/2019 | Avraham et al. |
| 10,475,523 B2 | | 11/2019 | Sharon et al. |

(Continued)

OTHER PUBLICATIONS

U.S. Appl. No. 18/242,061, filed Sep. 5, 2023, entitled "Data Storage Device and Method for Predicting Future Read Thresholds."
U.S. Appl. No. 18/777,942, filed Jul. 19, 2024, entitled "Data Storage Device and Method for Using Multiple Models for Predicting a Read Threshold."
U.S. Appl. No. 18/800,681, filed Aug. 12, 2024, entitled "Data Storage Device and Method for Combining Prediction Models for Read Threshold Calibration."

(Continued)

*Primary Examiner* — Uyen Smet
(74) *Attorney, Agent, or Firm* — Crowell & Moring LLP

(57) ABSTRACT

A data storage device has an inference engine that can infer a read threshold based on a non-linear function of inputs that reflect current memory and data conditions. The read threshold can be used in reading a wordline in the memory. Using a machine-learning-based approach to infer a read threshold can provide significant improvement in read threshold accuracy, which can reduce bit error rate and also improve latency, throughput, power consumption, and quality of service.

17 Claims, 9 Drawing Sheets

(56) References Cited

U.S. PATENT DOCUMENTS

| | | | |
|---|---|---|---|
| 10,811,075 B1 * | 10/2020 | Cheng | G11C 11/40603 |
| 10,811,091 B2 | 10/2020 | Bazarsky et al. | |
| 10,991,444 B1 | 4/2021 | Bazarsky et al. | |
| 11,081,474 B1 | 8/2021 | Hoang et al. | |
| 11,150,825 B2 | 10/2021 | Kashyap et al. | |
| 11,244,732 B2 | 2/2022 | Sharon et al. | |
| 2012/0063227 A1 | 3/2012 | Weingarten et al. | |
| 2014/0056066 A1 | 2/2014 | Baum et al. | |
| 2014/0136927 A1 | 5/2014 | Li | |
| 2017/0139590 A1 | 5/2017 | Hsu et al. | |
| 2017/0162268 A1 | 6/2017 | Chen et al. | |
| 2017/0271031 A1 * | 9/2017 | Sharon | G11C 29/52 |
| 2018/0293029 A1 | 10/2018 | Achtenberg | |
| 2018/0293174 A1 | 10/2018 | Song | |
| 2019/0189202 A1 * | 6/2019 | Avraham | G11C 16/3418 |
| 2019/0189236 A1 | 6/2019 | Poliakov et al. | |
| 2019/0371402 A1 | 12/2019 | Lin | |
| 2020/0364108 A1 | 11/2020 | Froelich et al. | |
| 2020/0364118 A1 | 11/2020 | Sun | |
| 2021/0223974 A1 * | 7/2021 | Zhang | G06F 3/061 |
| 2021/0241845 A1 | 8/2021 | Li et al. | |
| 2021/0334035 A1 | 10/2021 | Sheperek et al. | |
| 2022/0027721 A1 | 1/2022 | Zhang et al. | |
| 2022/0075561 A1 | 3/2022 | Peltz et al. | |
| 2022/0076738 A1 | 3/2022 | Bazarsky | |
| 2022/0121387 A1 | 4/2022 | Ha et al. | |
| 2022/0121985 A1 | 4/2022 | Lloyd et al. | |
| 2022/0254419 A1 | 8/2022 | Kim et al. | |
| 2023/0352108 A1 * | 11/2023 | Penzo | G11C 16/0483 |
| 2025/0118376 A1 | 4/2025 | Shenoy | |

OTHER PUBLICATIONS

U.S. Appl. No. 18/664,514, filed May 15, 2024, entitled "Data Storage Device and Method for Generating Read Threshold Voltages."

U.S. Appl. No. 18/658,074, filed May 8, 2024, entitled "Data Storage Device and Method for Predictive Read Threshold Calibration."

U.S. Appl. No. 18/772,563, filed Jul. 15, 2024, entitled "Data Storage Device and Method for Using Modular Models for Inferring a Read Threshold."

U.S. Appl. No. 17/838,481, filed Jun. 13, 2022, entitled "Storage System and Method for Inference of Read Thresholds Based on Memory Parameters and Conditions."

U.S. Appl. No. 17/899,073, filed Aug. 30, 2022, entitled "Storage System and Method for Implementation of Symmetric Tree Models for Read Threshold Calibration."

U.S. Appl. No. 18/220,363, filed Jul. 11, 2023, entitled "Storage System and Method for Circuit-Bounded-Array-Based Time and Temperature Tag Management and Inference of Read Thresholds."

Non-final Office Action mailed Jun. 16, 2025 for U.S. Appl. No. 18/220,363.

Non-final Office Action mailed Jun. 16, 2025 for U.S. Appl. No. 18/664,514.

Non-final Office Action mailed Jun. 16, 2025 for U.S. Appl. No. 18/242,061.

* cited by examiner

DATA STORAGE DEVICE AND METHOD FOR INFERRING A READ THRESHOLD USING A TIME TAG DETERMINATION

BACKGROUND

One of the main challenges introduced by NAND process shrinking and three-dimensional stacking is maintaining process uniformity. In addition, memory products need to support a wide range of operational conditions, such as different program/erase cycles, retention times, and temperatures, which leads to increased variability between memory dies, blocks, and pages across the different operational conditions. Due to these variations, the read thresholds used for reading a memory page are not fixed and change significantly as a function of the physical location and the operational conditions, especially for less-mature, new memory nodes. Reading with inaccurate read thresholds can lead to higher bit error rates, which can degrade performance and quality of service due to decoding failures, which require invoking high-latency recovery flows, causing delays and hiccups in performance.

DETAILED DESCRIPTION

The following embodiments generally relate to a data storage device and method for inferring a read threshold using a time tag determination (e.g., time tag optimization through light machine learning application). In one embodiment, a method is provided that is performed in a data storage device comprising a memory. The method comprises: inferring a read threshold based on a non-linear function of a plurality of inputs that reflect current memory and data conditions; and using the read threshold in reading a wordline in the memory.

In another embodiment, a data storage device is provided comprising a memory and a controller. The controller is configured to use an inference engine to infer a read threshold to read a wordline in the memory based on data available during a time tag update and not on data currently associated with the wordline; and use the read threshold to read the wordline.

In yet another embodiment, a data storage device is provided comprising: a memory; means for inferring a read threshold based on a non-linear function of a plurality of inputs that reflect current memory and data conditions; and means for using the read threshold in reading a wordline in the memory.

Other embodiments are provided and can be used alone or in combination.

Figure 1A:
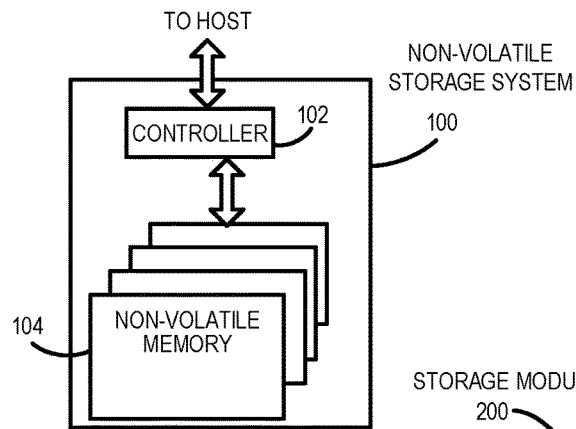
FIG. 1A is a block diagram of a non-volatile storage system of an embodiment.
Figure 1B:
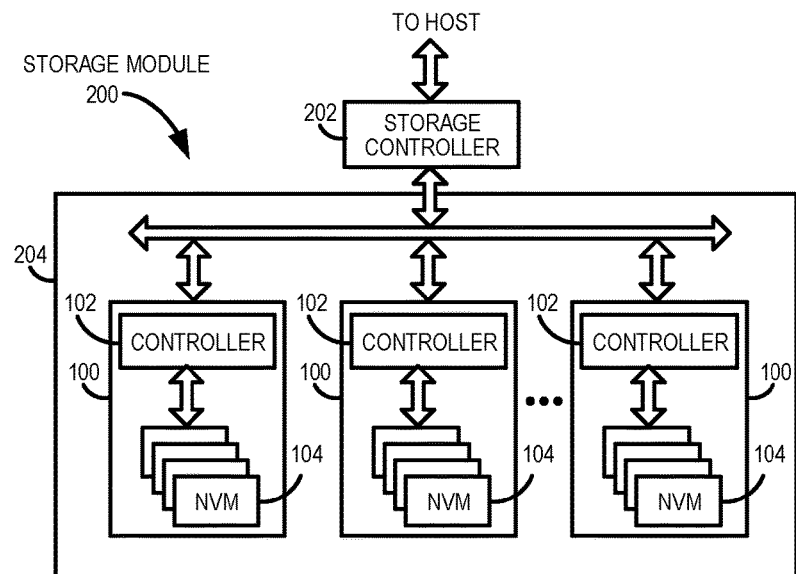
FIG. 1B is a block diagram illustrating a storage module of an embodiment.
Figure 1C:
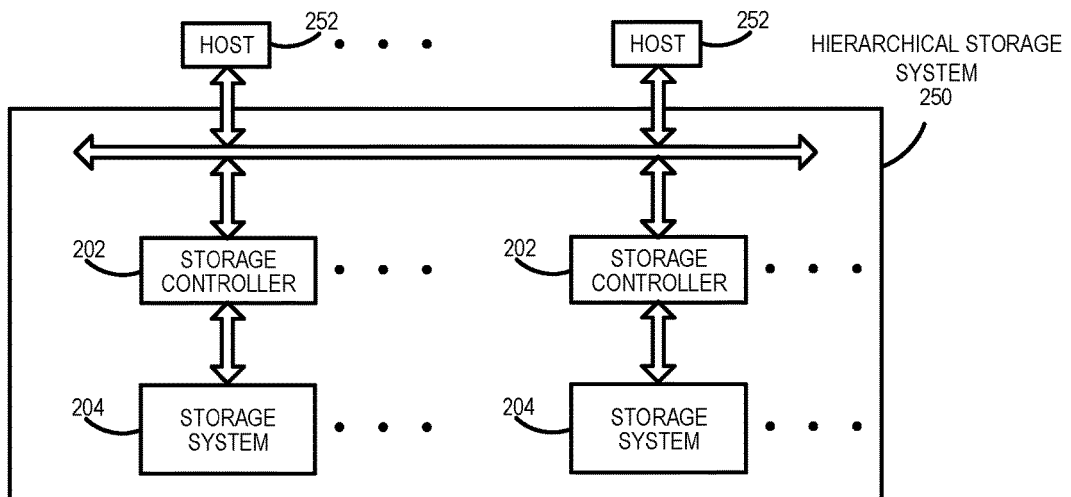
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level (one-bit per cell) cells (SLC) or multiple-level cells (MLC), such as two-level cells, triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
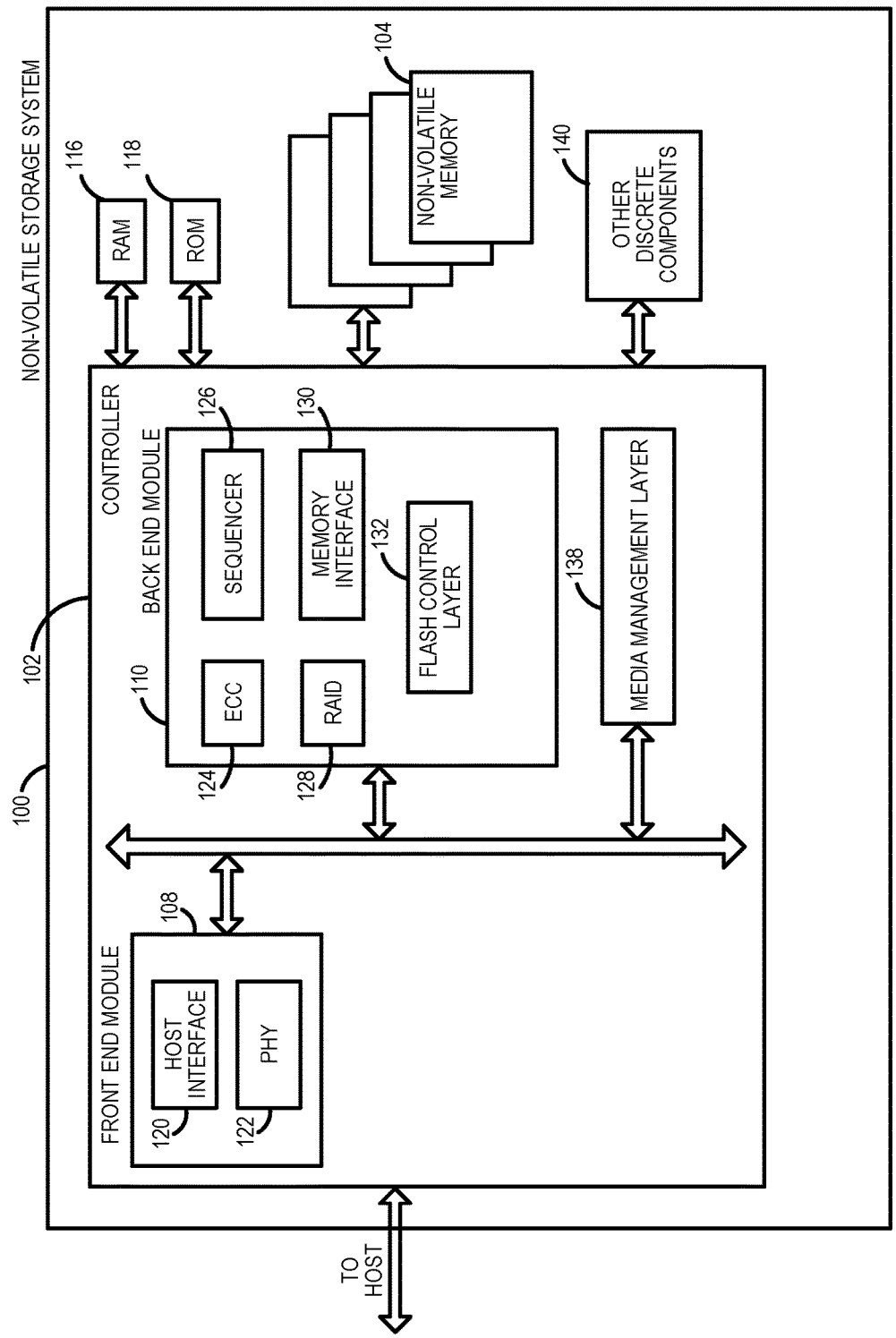
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
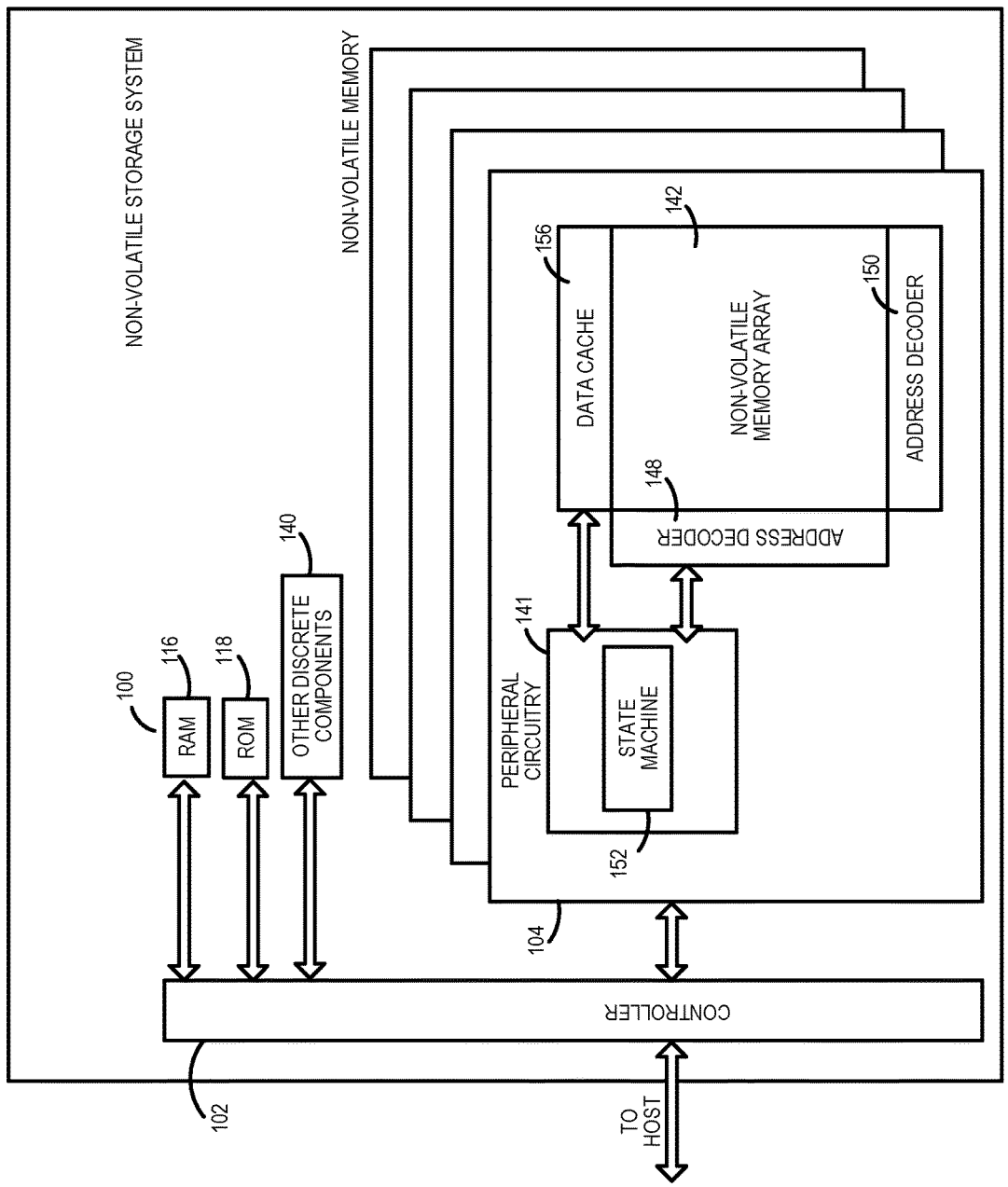
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
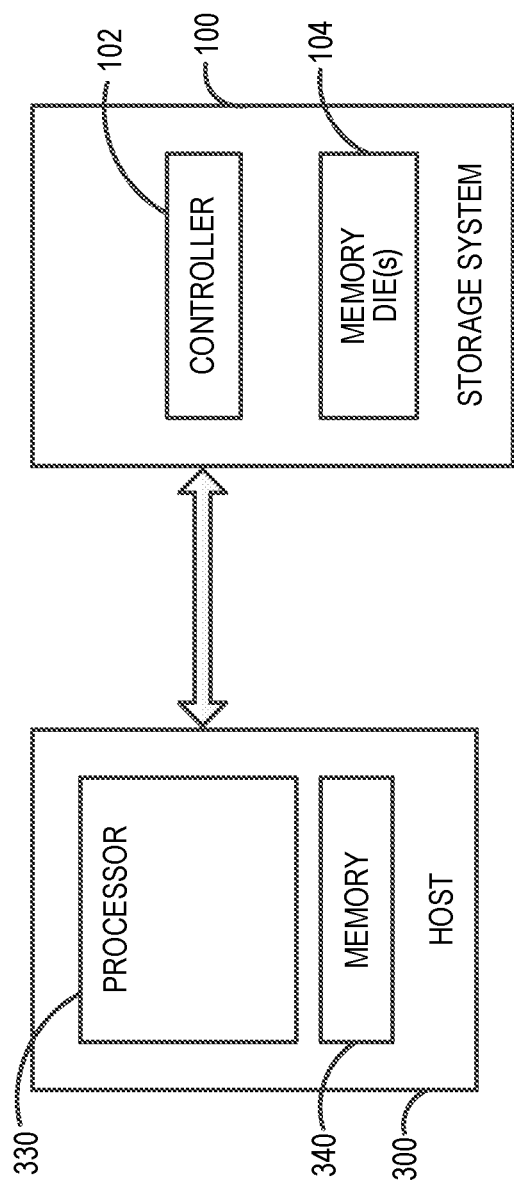
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

As mentioned above, one of the main challenges introduced by NAND process shrinking and three-dimensional stacking is maintaining process uniformity. In addition, data storage devices often need to support a wide range of operational conditions (such as different program/erase (P/E) cycles, retention times, and temperatures), which can lead to increased variability between memory dies, blocks, and pages across the different operational conditions. Due to these variations, the read thresholds (RT) used for reading a memory page are not fixed and change significantly as a function of the physical location and the operational conditions, especially for less-mature new memory nodes.

Reading with inaccurate read thresholds can lead to higher bit error rates (BERs), which can degrade the performance and quality of service (QOS) of the memory due to decoding failures that require invoking high-latency recovery flows, causing delays and hiccups in performance. The challenge of maintaining an optimal read threshold is especially important for enterprise memory systems, for which the QoS requirements are very strict, and for mobile, Internet of Things (IoT), and automotive memory systems for which the required range of operational conditions is wide and the frequency of condition changes (e.g., temperature) may be high. The problem is even harder during transitions to new, less mature memory nodes.

Current solutions for read threshold calibration, such as BER estimation scan (BES) and valley search (VS), are high-latency operations aimed at optimizing read thresholds for a specific wordline, which is good for rare read recovery flows in cases of failure to decode the data but may not be suitable for frequent operations in case of frequent read threshold changes. To cope with this issue, data storage devices can implement read threshold management schemes, which try to track read threshold changes in the background via a maintenance process to help ensure that appropriate read thresholds are used when the host issues a read command.

One read threshold management approach is to track the read threshold per groups of blocks in the memory that share the same conditions. More specifically, blocks that are written approximately at the same time and temperature are grouped into Time and Temperature (TT) groups ("TT" is sometimes also referred to herein as a time tag). Read thresholds are tracked for each TT group, usually acquired on some representative wordline from a block within the group (e.g., via BES or VS). When the host performs a read operation, the read threshold associated with the TT group corresponding to the read block are used. Adaptation of the read threshold according to the specific read wordline can be performed based on pre-calibrated wordline zoning tables (i.e., predefined corrections can be applied to the read threshold of the representative wordline based on the wordline number being read).

In case a certain wordline shows an elevation in BER or that decoding of the wordline's data fails (e.g., a corrected error (CECC)), BES or VS can be applied in the foreground to calibrate the wordline's read threshold as part of a read error handling (REH) flow. The indicative wordline can be usually chosen on the edge of the block, such that BER elevation is caught quickly.

One problem with this approach is that the data is not fitted to a specific set of parameters and is rather grouped over similar conditions to get suboptimal but reasonable results (e.g., because it does not perfectly track the read threshold under frequently-changing conditions and high variations between memory pages). In theory, it is possible to run a direct calculation of the read thresholds for every read flash management unit (FMU) to yield near-optimal results. However, as the duration of performing read threshold calibration on the physical storage is very long, such a method may not be able to reach satisfactory performance and, therefore, may be impractical.

Other table-based methods can also be used. However, due to practical table size limitations, such methods may only take into account a limited, small number of parameters or, alternatively, assume a simplistic model, where each factor (wordline number, PEC, temperature, data retention rate, RD, die dependency, etc.) affects the read threshold in an independent and additive manner, while in reality, the interactions may be more involved and can be a more-complex, non-linear function of the various factors. Covering all sets of conditions in the direct manner of storing informative data tables for all relevant cases may result in an impractical data table size that would be very expensive to hold and manage.

Figure 4:
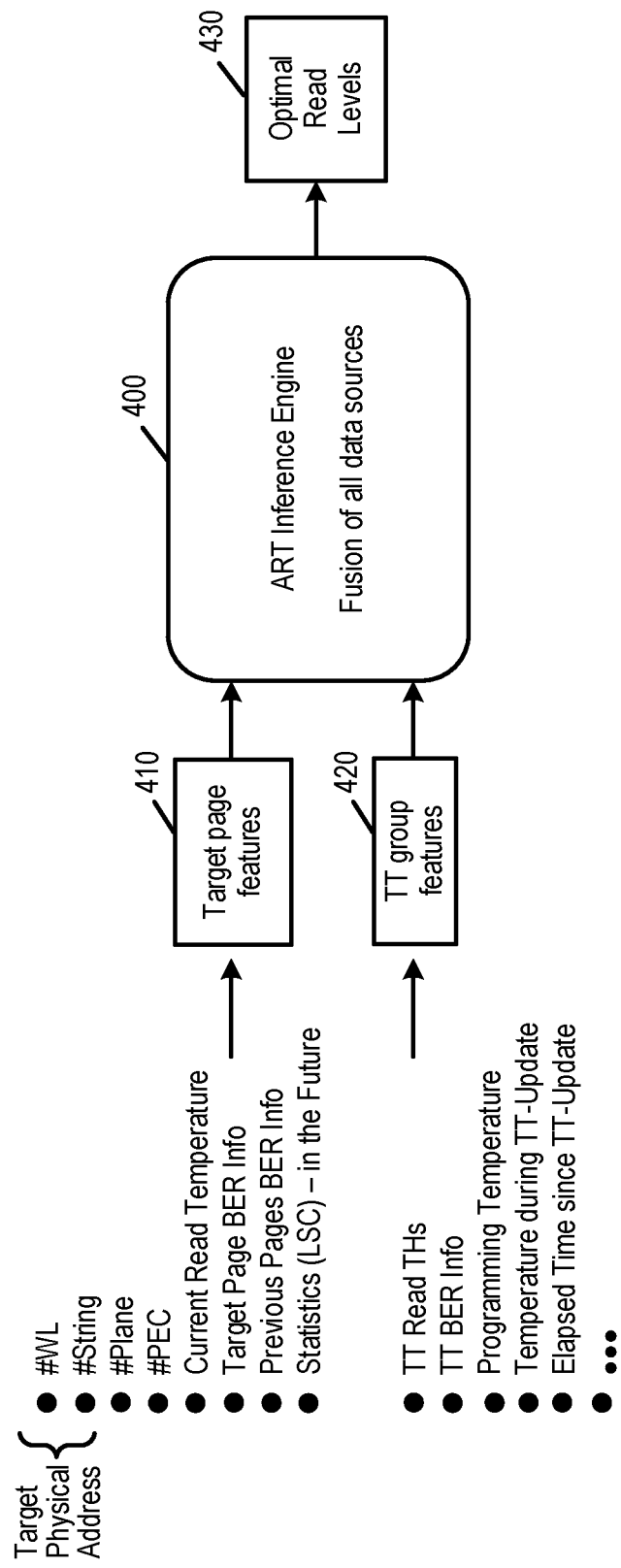
FIG. 4 is a diagram of an inference engine of an embodiment used for machine-learning-based read threshold calibration.

Other approaches are described in U.S. patent application Ser. Nos. 17/838,481 and 17/899,073, which are hereby incorporated by reference. Some of those approaches apply machine-learning-based methodologies in the controller of the data storage device for inference of optimal read thresholds based on various memory parameters and the usage of data sources, such as data regarding the current target page. FIG. 4 is a diagram of an inference engine of an embodiment used for machine-learning-based read threshold calibration. As shown in FIG. 4, an interference engine 400 takes, as input, target page features 410 and time and temperature (TT) group features, and, from those inputs, infers optimal read threshold levels 430. So, in this approach, all the available data sources are fused to provide an inference of the optimal read levels for each and every page or flash management unit (FMU) in the data storage device. (It should be understood that instead of being optimal, the inferred read threshold levels can be near-optimal or even just better in some degree that read threshold levels that would be available without using this approach.) One possible downside of this approach may be that it is computationally heavy and may call for dedicated computational resources during the read of a target page. In another embodiment, a more-straightforward firmware implementation can be used. However, this implementation may be associated with long processing latency that can cause hiccups in the firmware flow or require the addition of a dedicated hardware.

The following embodiments present a low-complexity system and method for inferring near-optimal read thresholds based only on the data available during a TT update, including TT group information, temperature information, BER information, and program-erase-count (PEC) information. These embodiments can be used to infer near optimal read thresholds with very-low interference to the data storage device, thereby allowing a firmware-based solution to be used, where the inference is driven by firmware in a manner that does not interrupt the firmware flow yet yields excellent results. Such a "light-weight" solution may be important for implementing a machine-learning-based read-threshold-setting method without the support of dedicated hardware. So, these embodiments can be used to infer near-optimal read thresholds with a small firmware footprint and minimal usage of system resources. This can be done by calling for action only once in a TT update, thus avoiding long background runs. Also, these embodiments do not need to directly approach the memory in order to generate threshold calibrations and are faster than BES. As such, the use of these embodiments can be a negligible addition to an existing TT calibration scheme.

In general, these embodiments can infer optimal read thresholds based on a non-linear function of multiple inputs that reflect current memory and data conditions. This solution can be uniquely fitted to provide improved results while being infrequently invoked, reducing the BER levels of read data, improving performance and QoS, and reducing the power consumption and CECC rate. The following paragraphs provide several examples ways in which to perform read threshold inference (e.g., regarding the base TT update process and refining the acquired read threshold). It should be noted that these are merely examples and that other implementations can be used. As such, details of these examples should not be read into the claims unless expressly recited therein.

Figure 5:
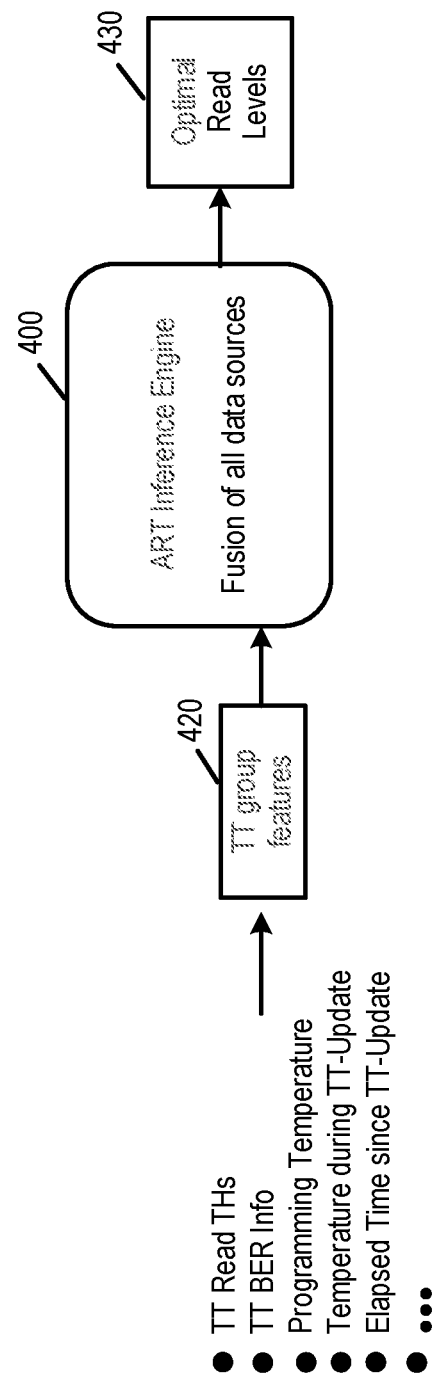
FIG. 5 is a diagram of an inference engine of an embodiment where target page features are not used for machine-learning-based read threshold calibration.

One example relates to periodic inference. The features used by the inference model may have different update periods. While some change constantly, others change rarely. Typically, the data that relates to a certain target page changes from page to page, while the TT features are fairly static and may change only during the time tag update process, which can be done once in a long while (e.g., once every 15 minutes, once an hour, once a day etc., depending on the product and on the use conditions). As shown in FIG. 5, if the inference engine 400 (which can be in the controller 102 of the data storage device 100) uses only the TT related features 420 and ignores the target features, the inference itself could be done during the TT update intervals. This would trade off some accuracy for a more-relaxed system and reduce its complexity overhead. This also allows the read thresholds to be inferred in the background (e.g., either when the TT update is performed or sometime after it). If the inference is not done at the time of the TT update, TT read thresholds can be used (with some degraded performance) until refined by the model at a time more convenient to the data storage device 100. In this manner, the inference can be detached from the TT update process itself for finer operation granularity.

Another example relates to periodic inference with wordline zoning. One of the features of this example is waiving the wordline number. The wordline number has a distinct effect on the read thresholds due to the physical differences of the memory parts. Therefore, it would be advantageous to add it to the read threshold inference. In order to do so, a foreground step can be used. The wordline number may already be part of the read flow in data storage devices that use a wordline zoning table that holds a correction term per wordline group that is added to the TT read threshold. Hence, if during the training time, the data is changed to reflect the effect of the wordline zoning, the model can take this into consideration and avoid any biases it would have added to negate this effect.

Figure 6:
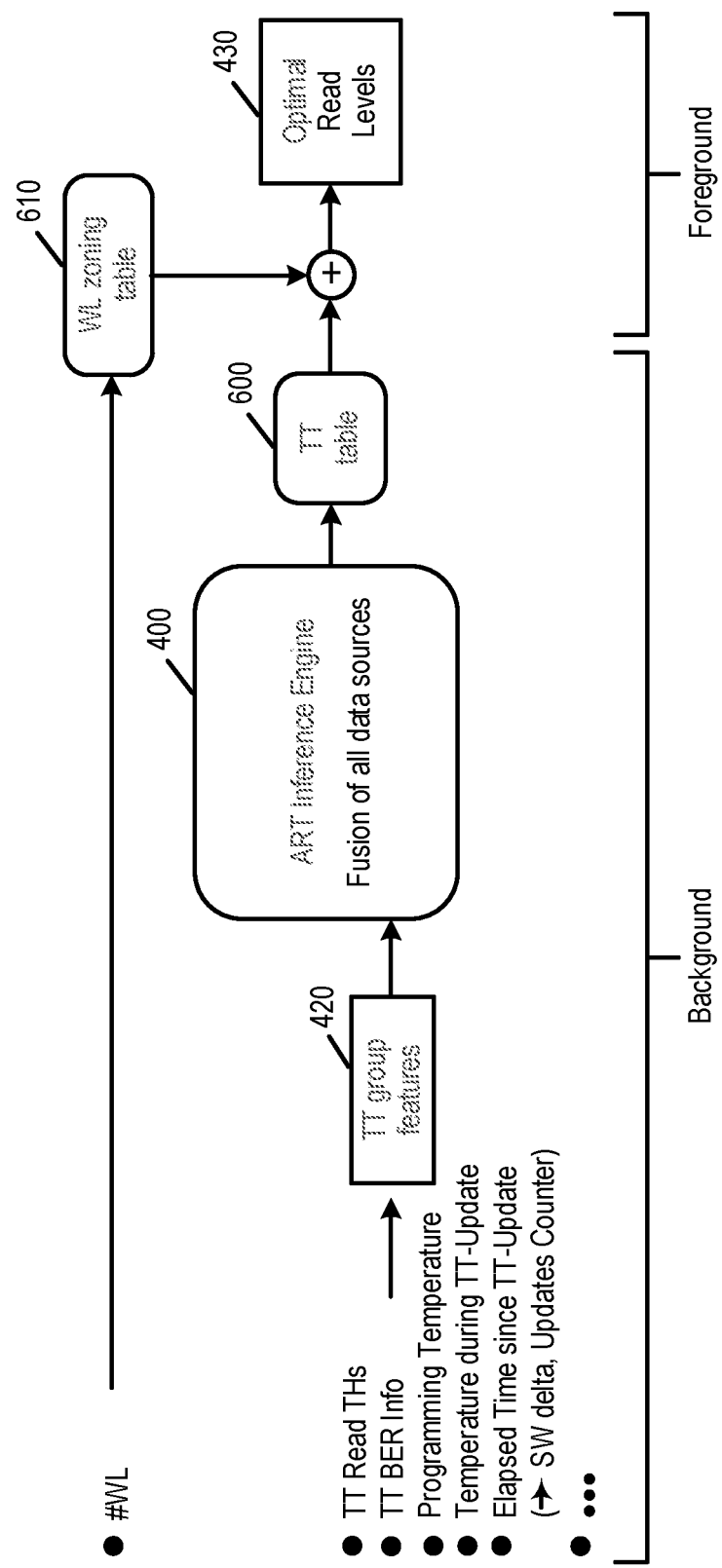
FIG. 6 is a diagram of an inference engine of an embodiment that uses a background-foreground approach.

This example is illustrated in FIG. 6. As shown in FIG. 6, the inference engine 400 takes the TT group features as input and outputs a TT table 600. That operation can be performed in the background. The read threshold information in that table is then modified by information from a wordline zoning table 610 with a reference wordline number, with the result of the modification being optimal read levels 430. That operation can be performed in the foreground. As the background part would typically be performed infrequently and the foreground part can be represented by only a lookup in a table (and is already part of the read flow), this example has the advantage of not incurring a latency penalty.

The inference model can be viewed as an approximation of a multiple input function in a compact manner, where the alternative would be to hold a large look-up table that would contain the values for all the combinations of all the input variables. As the alternative may not be feasible, the machine-learning model in this example is appealing. However, the data storage device 100 can still hold some lookup tables explaining part of this multidimensional function and avoid using them for inference, thus enabling a more-relaxed inference schedule and a precise outcome. One such example can be to use a wordline zoning table per plane/string in case there is consistent variation between the planes/strings in the wordline offsets. Another option is to use multiple wordline zoning tables according to the read temperature.

In one example implementation, the wordline number is a strong, constantly-changing feature, thus worth transferring from the background to the foreground. However, in general, explicit values can be separated from the inference as long their number is sufficiently small to hold the lookups in memory and have a sufficient benefit and as long as they are taken into consideration when training the model. The lookup values themselves can be obtained with the same big data used for the model training, thus obtaining both background and foreground parts of the data storage device 100 with the same data collection process.

Turning now to yet another example embodiment, read thresholds can be inferred only when the TT thresholds are changed. In some data storage devices, inferring once every TT update can be too challenging and may call for an even-more relaxed scheme. However, most of the TT updates do not change the TT read thresholds but rather just validate them to ensure they still hold, in which case the only features that would change are the TT BER values, which indicate the BER level that the current TT values generate and any counter of time since the TT update. These inputs can help to model data retention effects and track BER elevation for additional countermeasures in case it passes some threshold. If the effects of data retention may be ignored, assuming that raising BER will trigger new read threshold acquisition, the remaining inputs to the model can only change when once in every several TT update procedures when the read thresholds are deemed unfit over some threshold.

Figure 7:
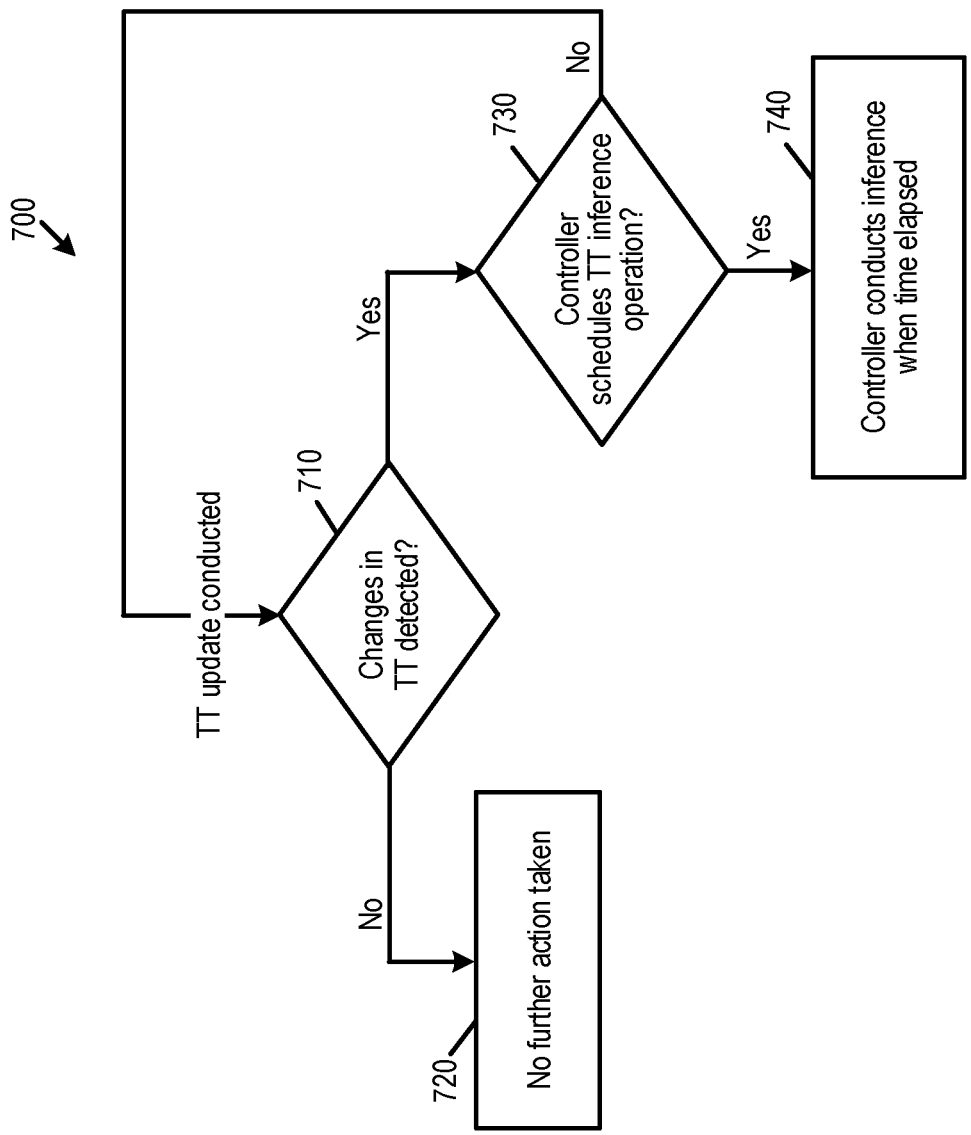
FIG. 7 is a flow chart of a method of an embodiment for time tag optimization through light machine learning application.

FIG. 7 is a flow chart 700 of a method of an embodiment where the read threshold inference is triggered only with TT thresholds are changed. As shown in FIG. 7, in this method, the controller 102 of the data storage device 100 determines if changes in TT thresholds are detected (act 710). If changes are not detected, no further action is taken (act 720). However, if changes are detected, the controller 102 determines whether a TT inference operation should be schedule (act 730). If the controller 102 determines not to schedule a TT inference operation, the method loops back to act 710. However, if the controller 102 determines to schedule a TT inference operation, the controller 102 conducts the read threshold inference after a period of time has elapsed (act 740).

In another example embodiment, read thresholds are inferred upon temperature and program-erase-count (PEC) changes. Some data storage systems may have fewer constraints. Though they may not be able to infer read thresholds for every incoming read command, they may be able to infer read thresholds once every second or minute. In this case, the model can add other features that change faster than the TT group but not from FMU to FMU (e.g., PEC, current temperature, and even BER statistics).

Figure 8:
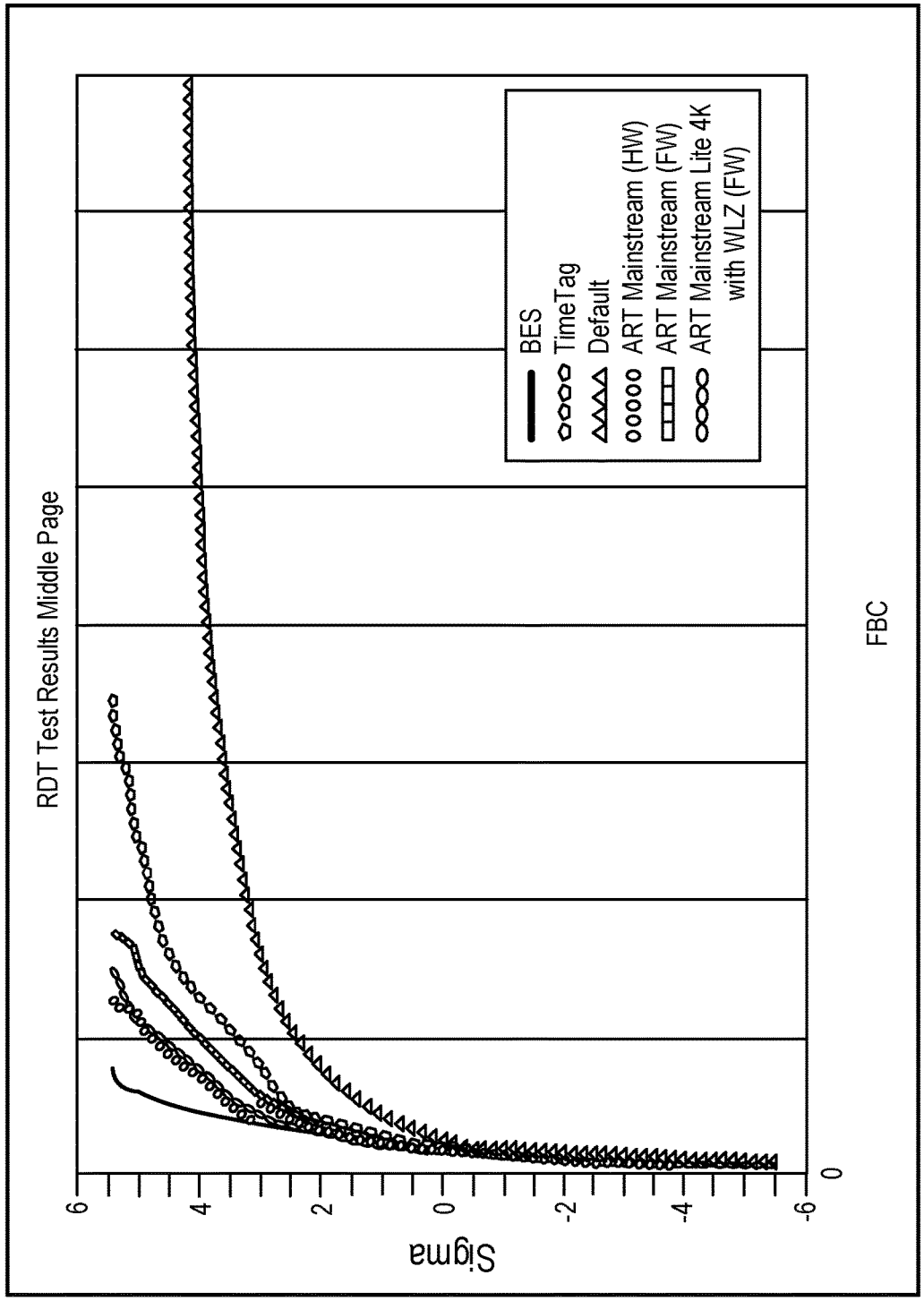
FIG. 8 is a Sigma-Plot graph for averaged failed bit count (FBC) for different example test conditions of an embodiment.

FIG. 8 is a Sigma-Plot graph for averaged failed bit count (FBC) for different example test conditions of an embodiment. These results are based on an experiment that compared several read threshold acquiring schemes, and the test was performed in field conditions with sequential/random write/read workloads and continuous chamber temperature sweeps to induce all Temp/X-Temp conditions→temperatures span 10C to 90C. As shown in FIG. 8, the TT-acquired read thresholds reached higher FBCs than all the ART-acquired read threshold FBCs. Also, the periodic inference approach shows better FBCs than the TT but still shows a significant gap from the full hardware mainstream ART implementation cyan. However, adding the wordline zoning in the foreground to the period inference closes most of the gap from the full hardware version. This provides an appealing alternative for data storage devices that cannot implement the hardware version.

There are several advantages associated with these embodiments. For example, these embodiments can be used to generate improved read thresholds resulting in reduced BER, which can improve memory latency and throughput, reduce power consumption, reduce CECC rates, and improve QoS. These embodiments can be performed in firmware, thus allowing this solution to be used in to lower-cost/existing controllers.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional (2D) memory structure or a three-dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. In a data storage device comprising a memory, a method comprising:
    using firmware in the data storage device to infer a read threshold to use in reading a wordline in the memory, wherein the read threshold is inferred:
        prior to the data storage device receiving a read command from a host that causes the wordline to be read;
        only during a time and temperature update; and
        based only on one or more inputs available during the time and temperature update, wherein a wordline number of the wordline is not one of the one or more inputs; and
    in response to receiving the read command from the host:
        looking up the wordline number in a pre-calibrated wordline zoning table comprising a plurality of pre-defined correction values associated with a respective plurality of wordline numbers;
        modifying the inferred read threshold based on a correction value associated with the wordline number in the pre-calibrated wordline zoning table; and
        using the modified inferred read threshold to read the wordline.

2. The method of claim 1, wherein the read threshold is inferred by using machine learning in a background and a static table in a foreground.

3. The method of claim 2, wherein the machine learning is trained to take into account future static tables in the foreground.

4. The method of claim 1, wherein the one or more inputs comprises programming temperature.

5. The method of claim 1, wherein the one or more inputs comprises elapsed time since a prior time tag and temperature update.

6. The method of claim 1, wherein the one or more inputs comprises bit error rate (BER) information.

7. The method of claim 1, further comprising updating the read threshold periodically.

8. A data storage device comprising:
    a memory; and
    a processor configured to execute firmware to:
        infer a read threshold to use to read a wordline in the memory, wherein the read threshold is inferred:

prior to the data storage device receiving a read command from a host that causes the wordline to be read;

only during a time and temperature update; and based only on one or more inputs available during the time and temperature update, wherein a wordline number of the wordline is not one of the one or more inputs; and in response to receiving the read command from the host:

look up the wordline number in a pre-calibrated wordline zoning table comprising a plurality of predefined correction values associated with a respective plurality of wordline numbers;

modify the inferred read threshold based on a correction value associated with the wordline number in the pre-calibrated wordline zoning table; and use the modified inferred read threshold to read the wordline.

9. The data storage device of claim 8, wherein the one or more inputs comprise programming temperature.

10. The data storage device of claim 8, wherein the one or more inputs comprise elapsed time since a prior time tag and temperature update.

11. The data storage device of claim 8, wherein the one or more inputs comprise bit error rate (BER) information.

12. The data storage device of claim 8, wherein the processor is further configured to periodically infer read thresholds.

13. The data storage device of claim 12, wherein the read thresholds are inferred when a time tag threshold has changed.

14. The data storage device of claim 12, wherein the read thresholds are inferred when a temperature has changed.

15. The data storage device of claim 8, wherein the memory comprises a three-dimensional memory.

16. A data storage device comprising:

a memory; and means for:

using firmware in the data storage device to infer a read threshold to use in reading a wordline in the memory, wherein the read threshold is inferred:

prior to the data storage device receiving a read command from a host that causes the wordline to be read;

only during a time and temperature update; and based only on one or more inputs available during the time and temperature update, wherein a wordline number of the wordline is not one of the one or more inputs; and in response to receiving the read command from the host:

looking up the wordline number in a pre-calibrated wordline zoning table comprising a plurality of predefined correction values associated with a respective plurality of wordline numbers;

modifying the inferred read threshold based on a correction value associated with the wordline number in the pre-calibrated wordline zoning table; and using the modified inferred read threshold to read the wordline.

17. The data storage device of claim 12, wherein the read thresholds are inferred when a program-erase-cycle (PEC) count has changed.

\* \* \* \* \*